United States Patent [19]

Love, Jr. et al.

[11] 4,364,267

[45] Dec. 21, 1982

[54] METHOD AND APPARATUS FOR CORRELATING TIRE INFLATION PRESSURE AND LOAD

[75] Inventors: Robert R. Love, Jr.; Elbert W. Leatherman, both of Cumberland, Md.

[73] Assignee: The Goodyear Tire & Rubber Company, Akron, Ohio

[21] Appl. No.: 179,630

[22] Filed: Aug. 20, 1980

[51] Int. Cl.$^3$ .......................... G01L 17/00; G01L 1/00
[52] U.S. Cl. ..................................... 73/146; 73/146.2
[58] Field of Search ................ 73/146, 146.2; 177/25, 177/264

[56] References Cited

U.S. PATENT DOCUMENTS

| 1,849,730 | 3/1932 | Morse | 73/146 |
| 2,959,460 | 11/1960 | De Vost | 73/492 |
| 3,071,973 | 1/1963 | Helfand | 73/492 |

FOREIGN PATENT DOCUMENTS

| 1274904 | 8/1968 | Fed. Rep. of Germany | 73/146.2 |
| 575680 | 2/1946 | United Kingdom | 73/146 |

OTHER PUBLICATIONS

"An Apparatus for Determining the Actual Footprint Area of Tires" by Pizer et al., from *Materials Research and Standards*, vol. 10, No. 2, pp. 20-23, Feb. 1970.
"Automatic Checking Pneumatic Tires Under Load" by Falkoff from *IBM Technical Disclosure Bulletin*, vol. 9, No. 8, Jan. 1967.

*Primary Examiner*—James J. Gill
*Attorney, Agent, or Firm*—T. P. Lewandowski

[57] ABSTRACT

Method and apparatus for correlating tire inflation pressure and tire load in the field using static footprint length on a tire contact gauge, pressure sensitive recording paper and a nomogram to determine actual tire load of a tire mounted on a vehicle.

13 Claims, 5 Drawing Figures

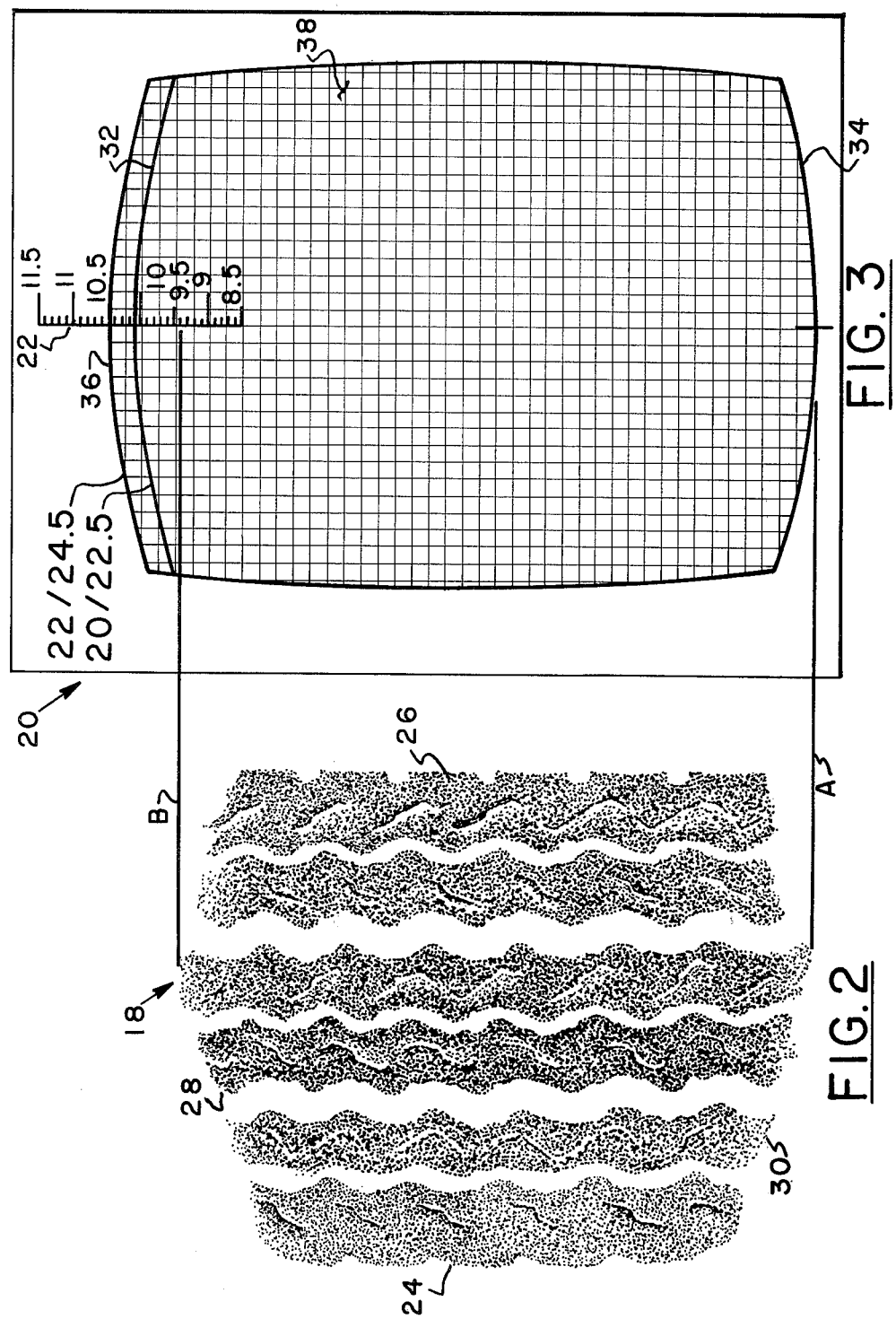

METHOD AND APPARATUS FOR CORRELATING TIRE INFLATION PRESSURE AND LOAD

The present invention relates to correlating tire inflation pressure and tire load while being more particularly directed at a system useful in the field using a tire contact gauge, tire footprint recorder and nomogram to determine actual tire load.

It is well known to use tire footprints as indicators of tire performance in the laboratory both static and dynamic. Footprints of loaded tires are studied dynamically by both movie and TV camera viewing the tire passing over a transparent track. It is also known that actual tire load can be determined in the field using weigh scales. Weigh scales however are not always available to all field locations and generally require a fee for their use by the user. Further, the ideal conditions that exist in the lab do not exist in the field generally prohibiting use of lab-type footprint technology in the field.

The present invention, while useful in many environments, including the lab, overcomes the above problems by providing a system that is particularly useful in the field for determining tire load without the need for weigh scales in the form of a kit which does not require laboratory conditions nor laboratory type instrumentation. The system gives the further advantage of examining a footprint for numerous parameters such as inflation pressure, treadwear, camber, etc. It also gives proper inflation pressure without the need for separate charts once actual tire loading is known. Another advantage is that it correlates tire load and inflation pressure through use of a static footprint length. Also, the system uses apparatus which is compact and portable thereby making it usable at almost any location. The system does not require a large amount of space as in the case of weigh scales for its use and does present a graphic picture to the tire user of the performance he is getting from his tires. Finally, the system is adaptable to non-uniform loading from one vehicle tire to another to analyze each individual tire under its actual operating load.

Included in the apparatus for the present system to correlate tire pressure and loading would be means for determining the tire footprint such as pressure sensitive recording paper, means for obtaining tire inflation pressure such as a tire pressure gauge, means for determining footprint length such as a tire contact gauge which includes a predetermined footprint length thereon as well as a scale for measurement of other footprint lengths. The tire contact gauge is compatible with the recording paper for recording the footprint so that the two can be used for a comparison. Also included in the apparatus would be means for determining tire load such as a nomogram on which the footprint length obtained from the recording paper when compared with the scale of the tire contact gauge is plotted thereon together with the tire inflation pressure obtained from the pressure gauge to thereby obtain tire load.

The above apparatus may be used by a method which includes the steps of gauging the tire inflation pressure, providing footprint determining means on a hard, smooth backing, placing a tire inflated and loaded on the footprint determining means which is supported to give proper tire loading under full load of the tire to obtain an actual footprint, removing the tire and its load from the footprint determining means, comparing the actual footprint formed on the footprint determining means to means for determining footprint length to obtain the actual footprint length, and using, such as by plotting or calculating, the footprint length and tire pressure, for example, on a nomogram, to determine the actual load on the tire. Where the tire is loaded by being mounted on a vehicle the tire is raised above the surface on which it is setting and the recording paper is placed beneath the tire which is then lowered thereon to take its full load from the vehicle and thereby imprint a footprint length on the recording paper. The tire is then subsequently raised above the surface to permit removal of the recording paper to allow comparison of the footprint thereon with the means for determining footprint length.

The present invention can be better appreciated from the following description and with reference to the accompanying figures in which:

FIG. 2 is a footprint obtained in accordance with the method of the present invention;

FIG. 3 is a tire contact gauge in accordance with the present invention; and

Figure 1:
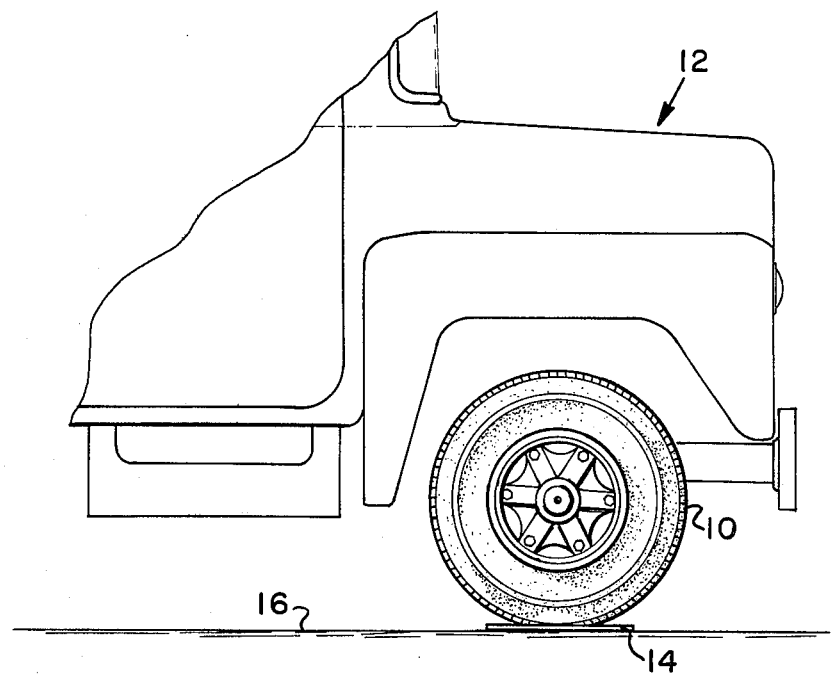
FIG. 1 is a fragmentary elevational view of a vehicle with a tire located on a portion of the apparatus associated with the present invention.

Referring to FIG. 1, there is illustrated a tire 10 mounted on a vehicle 12 which in this instance is a truck but could be a passenger car or other vehicle as well. The tire 10 rests on recording paper 14 which is supported by a smooth, hard backing which could be the surface 16 on which the vehicle is supported if it were, for example, smooth, clean concrete but otherwise could be of a piece of hard masonite or a metal plate or the like. An example of recording paper which is satisfactory for use with the present invention is Acutred's "Tire Print Out" which is a pressure sensitive carbon paper having a protective film on the surface thereof. Other means of obtaining a tire footprint are available such as inking the tire and placing it on plain paper to obtain an ink imprint as might be used in a laboratory. The recording paper is preferred for use in the field because of the convenience of its easier use. Other means can be envisioned which would also serve to provide a footprint 18 such as that illustrated in FIG. 2 including full size photographs, molds, etc. none of which are as convenient as the preferred recording paper. Of course, other recording papers could be used and would prove as satisfactory as the one noted above.

In FIG. 3 a tire contact gauge 20 is illustrated. The gauge 20 is made of clear plastic so that it is transparent and can be placed over the footprint 18 in FIG. 2 to determine the length of the footprint 18. It will be observed that if the footprint 18 and the guide 20 are aligned one over the other as indicated by construction lines A and B between FIGS. 2 and 3, the footprint length can be read from the linear scale 22 and as indicated by construction line B would be 9.4 inches long.

The footprint 18 in FIG. 2 is from a size 20/22.5 radial tire and the left side 24 can be seen to be shorter and of a different shape than the right side 26 indicating that camber on the tire should be checked. It has been determined that tires with proper camber will have outside ribs equal in length and shape. Also, the top and bottom radii 28 and 30, respectively can be seen to show irregular wear in comparison to the ideal radii on the tire contact gauge of FIG. 3 as indicated at 32 and 34, respectively. The upper radius on the tire contact gauge is labeled for the 20/22.5 tire size and an additional top radius 36 is also incorporated on the gauge for a 22/24.5 tire size having the same characteristics as the smaller 20/22.5 tire resulting in only the length of the footprints varying with all other characteristics being the same. The bottom radius 34 is common to both tire sizes on the tire gauge 20.

While the footprint 18 could be measured with a simple linear scale, it will be appreciated that the tire guide 20 provides a comparison of the actual footprint 18 to the preferred footprint on the tire gauge 20. The tire gauge 20 gives assurance that the footprint 18 is properly oriented when the length measurement is made and it can be further appreciated that the grid 38 will readily point out the differences resulting from non-uniform wear indicated by the footprint 18. Further, after realignment of a front end the tire gauge 20 can be used to confirm proper correction by re-footprinting and comparison to the tire gauge 20.

Whatever means for obtaining the footprint 18 length are used, they must be compatible with the means used for obtaining the footprint 18. It is conceivable that the means used to obtain the footprint could be scanned with sophisticated equipment using electronic or light energy sources to read the footprint and make the comparison to the preferred shape of the tire gauge 20 and presenting the differences therebetween if the expense of obtaining such type equipment could be justified. The embodiment presented herein requires the user by observation to determine these differences but on the other hand can be seen to be very simple to use and made up of inexpensive items which are adaptable to field use.

Figure 4:
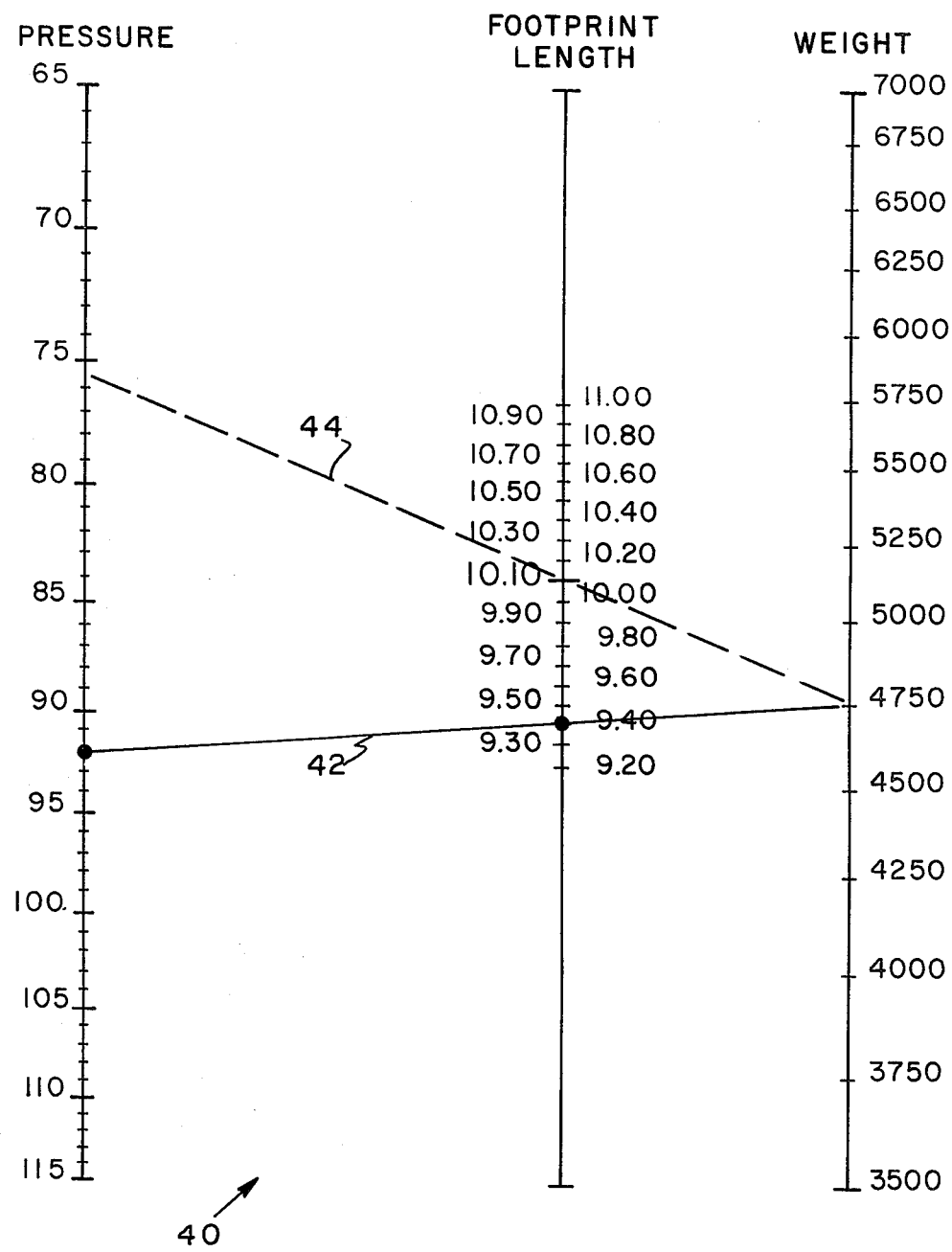
FIG. 4 and FIG. 5 are nomograms in accordance with the present invention.

FIG. 4 illustrates a nomogram 40 for a 20/22.5 radial tire having a column for tire pressure on the left in pounds per square inch, a column for footprint length in inches in the middle and a column tire load in pounds on the right. The inflation pressure of the tire for the footprint 18 in FIG. 2 was taken and found to be 92 psi. The tire pressure and footprint length were plotted on the nomograph on the left and middle columns respectively. By plotting it is meant that two points are located on two respective columns of the nomograph and a straight line drawn through the two points to intersect the third scale at which point of intersection the third value may be read. Thus, in FIG. 4 the tire inflation pressure of 92 psi was plotted in the left column, the footprint length of 9.4 inches was plotted in the middle column, and a straight line 42 was drawn through the two points to extend to the third or right column where the load on the tire could be read as 4750 pounds.

As noted above, the footprint 18 of FIG. 2 did not match the top radius 32 of the tire gauge 20. This indicated over-inflation of the tire. Returning to the nomogram of FIG. 4, the proper tire inflation pressure can be determined now that the tire load is known by plotting the tire load on the right column, the predetermined footprint length of 10.1 inches indicated by the top radius 32 on the tire gauge 20 and again drawing a straight line through the two points as indicated by the dotted line 44 on the nomogram of FIG. 4. The line 44 can be seen to intersect the left column at approximately 75 psi which is the preferred pressure for the tire.

Figure 5:
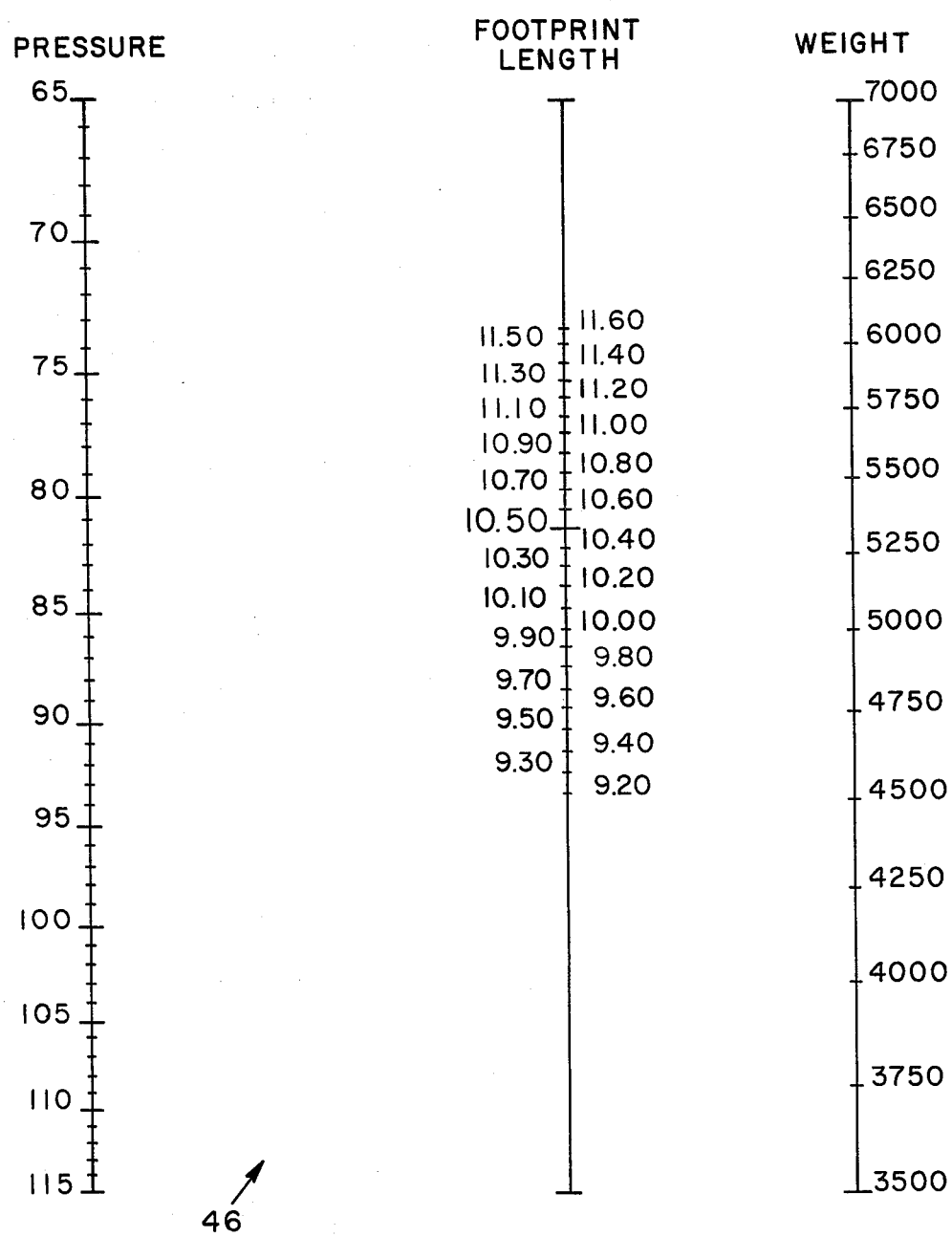

FIG. 5 illustrates a nomogram similar to that of FIG. 4 for a 22/24.5 size radial tire which would be used in conjunction with the top radius 36 on the tire gauge 20.

The tire gauge 20 and the nomograms 40 and 46 of FIGS. 4 and 5, respectively, were developed for new tires. Similar tire gauges and nomograms could be developed for tires that are past the break-in point and possibly a tire gauge and nomogram could even be developed for use with worn tires.

The tire guide 20 and nomographs 40 and 46 were developed after extensive investigation and testing of hundreds of tires collecting data such as tire pressure, footprint length, width and shape, and load on the tire until a predominant pattern could be found. This predominant pattern is the footprint shape on the tire gauge 20 for the specified tire. The data collected was sufficient to generate the curves on the tire gauge 20. As indicated by the tire gauge 20 of FIG. 3, each tire has its own characteristics with respect to footprint even though closely related tires will have closely related characteristics. Investigation during collection of the data used to develop the tire guide 20 showed the footprint 18 length to be sensitive within one-tenth of an inch, which change in length would result in a measurable change in load and/or pressure. The change was found to be repeatable for any 1/10" of length increment. The dominant shapes indicated by the predetermined patterns for the two tire sizes on the tire gauge 20 indicated little or no change in width between the two tires but a significant change in footprint 18 length. The change in footprint 18 length was found presentable in graph form as represented by the nomograms 40 and 46, respectively, and be expressible mathematically by the equation:

$$L = a \frac{W^{\frac{1}{2}}}{P^{\frac{1}{2}}}$$

where L is the length of the footprint in inches, 'a' is a constant, W is the tire load in pounds, and P is the inflation pressure in pounds per square inch. In analyzing the data to come up with a mathematical expression that would closely simulate the dominant pattern found in the data obtained, use of a computer regression type program was found useful. The constant 'a' was developed upon recognition that the load and pressure data varied little if any from the expressions $W^{\frac{1}{2}}$ and $P^{\frac{1}{2}}$, respectively. Any remaining differences between the tires, such as their diameters, were compensated by appropriate constants for each tire. The regression program was also useful in determining the constants.

The method of the present invention may be practiced by gauging the inflation pressure of a tire, placing the footprint determining media such as the recording paper 14 on a hard, smooth backing and placing an inflated, loaded tire on the recording paper 14 beneath the tire located on a firm surface capable of supporting and giving proper tire loading. As noted above, the apparatus for the present system is caable of providing tire loads even where the load distribution between the tires of a vehicle is nonuniform, however, it is important that the non-uniform loading not be due to adverse conditions such as an inclination to one side or a hill on which the vehicle might be setting. Thus, it is important that the vehicle be on a level surface when the present system is used. It is also important that the full load received by the tire be applied when the tire is placed on the recording paper. The tire should then be raised and the recording paper removed. A comparison is then made between the footprint on the recording paper and the predetermined shape on the means used to determine the tire footprint length such as the tire gauge 20 in FIG. 3. Finally, the footprint length is plotted along with the measured inflation pressure on a nomogram to obtain the actual load on the tire.

More particularly, the apparatus associated with the present system may be used in the field with tires mounted on vehicles by first raising one tire, gauging the tire inflation pressure, placing the recording paper 14 on a hard, smooth board or plate upon a concrete surface having located the vehicle on a level surface area and lowering the wheel onto the recording paper 14. The wheel is subsequently raised and the recording paper 14 removed. The tire data and wheel position, as well as vehicle identification should be recorded. The tire contact gauge 20 should be placed over the footprint 18 and a footprint length measurement made as well as a symmetry check of the footprint 18 shape against the predetermined shape of the tire gauge 20. After finding the footprint length and determining the inflation pressure, they can be applied to the nomograph 40 or 46 as described above to determine the actual load on the tire.

In accordance with the provisions of the patent statutes, the principle and mode of operation of the present system have been explained in what is considered to represent its best embodiment and has been illustrated and described. It should, however, be understood that the invention may be practiced otherwise than as specifically illustrated and described without departing from its spirit or scope.

We claim:

1. A method of correlating tire pressure and loading comprising the steps of:
   gauging the tire inflation pressure;
   providing footprint determining means on a hard, non-deflecting smooth backing;
   placing the tire, inflated and loaded, on the footprint determining means which is supported to give proper tire loading under full load of the tire to obtain an actual footprint;
   removing the tire and its load from the footprint determining means;
   comparing the actual footprint formed on the footprint determining means to means for determining footprint length to obtain an actual footprint length; and
   using the footprint length and tire pressure to determine the actual load on the tire.

2. The method in claim 1, wherein the tire is mounted on a vehicle and the step of placing the tire on the footprint determining means includes raising the tire, placing the footprint determining means beneath the tire, and lowering the tire onto the recording means so that the tire takes its full load.

3. The method in claim 1, wherein the step of using the footprint length and tire pressure to determine actual load includes plotting footprint length and tire pressure on a nomogram.

4. The method in claim 1, including the further step of plotting the actual load obtained and a predetermined footprint length on the nomogram to determine recommended tire pressure.

5. The method in claim 1, wherein the step of using the footprint length and tire pressure to determine actual load includes using the relationship:

$$L = a \frac{W^{\frac{1}{2}}}{P^{\frac{1}{2}}}$$

Where L is the length of the footprint in inches, 'a' is a constant, W is the tire load in pounds and P is the inflation pressure in pounds per square inch.

6. Apparatus for correlating tire pressure and loading comprising means for determining the tire footprint of a non-deflecting type; means for obtaining tire inflation pressure; a tire contact gauge, said tire contact gauge including a predetermined footprint length and a scale for measurement of other footprint lengths, said tire contact gauge further compatible with said means for determining the tire footprint to compare the tire footprint obtained therefrom with said tire contact gauge; and means for determining tire load using the footprint length obtained with said tire contact gauge and the tire inflation pressure obtained with the means for obtaining tire inflation pressure.

7. Apparatus as claimed in claim 6 wherein said tire contact gauge further includes a predetermined footprint width.

8. Apparatus as claimed in claim 6, wherein said tire contact gauge further includes a grid structure.

9. Apparatus as claimed in claim 6, wherein said means for determining tire load is a nomogram.

10. Apparatus as claimed in claim 6, wherein said tire contact gauge further includes top and bottom radii.

11. Apparatus for correlating tire pressure and loading comprising means for determining the tire footprint of a non-deflecting type; means for obtaining tire inflation pressure; means for determining footprint length compatible with said means for determining the tire footprint to compare the tire footprint obtained therefrom with said means for determining footprint length; and a nomogram on which the footprint length obtained from said means for determining footprint length may be plotted together with the tire inflation pressure obtained from said means for obtaining tire inflation pressure to thereby determine the load on the tire.

12. Apparatus as claimed in claims 6 or 11, wherein said means for determining the tire footprint also includes means for recording the footprint.

13. Apparatus as claimed in claims 9 or 11, wherein said nomogram can be expressed mathematically by the equation:

$$L = a \frac{W^{\frac{1}{2}}}{P^{\frac{1}{2}}}$$

Where L is the length of the footprint in inches, 'a' is a constant, W is the tire load in pounds, and P is the inflation pressure in pounds per square inch.

* * * * *